United States Patent Office 3,332,129
Patented July 25, 1967

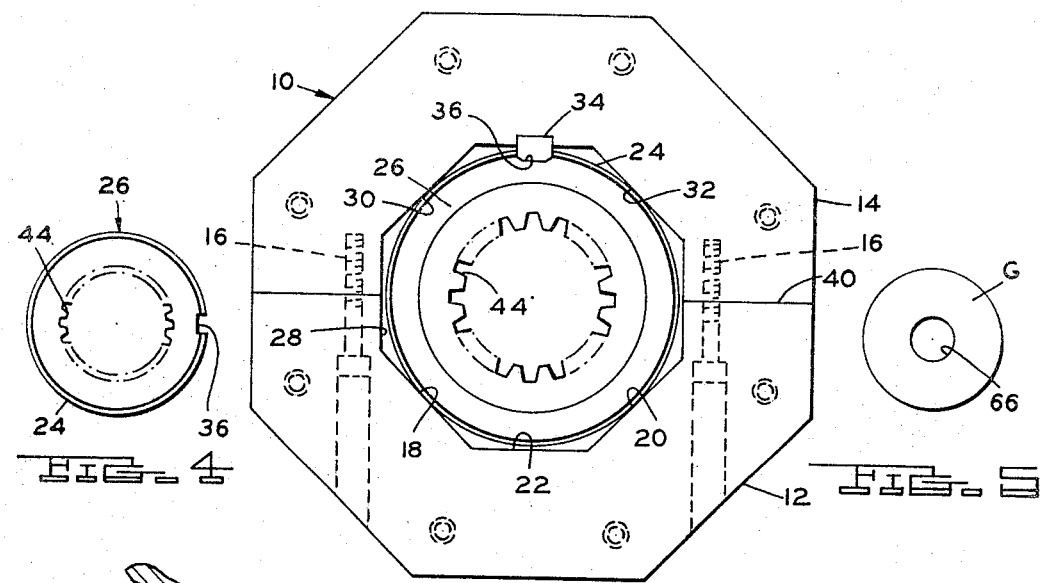
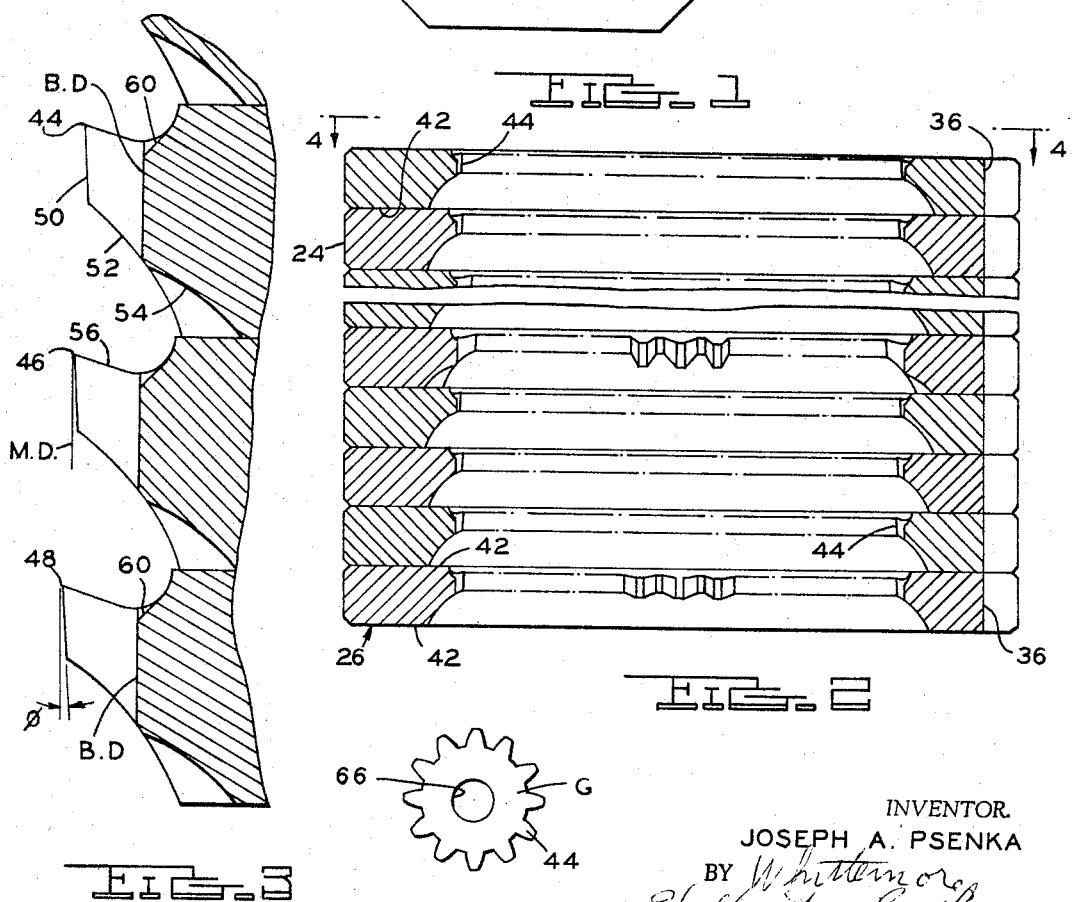

3,332,129
POT BROACH
Joseph A. Psenka, Bloomfield Hills, Mich., assignor to National Broach & Machine Company, Wayne, Mich., a corporation of Michigan
Filed Aug. 2, 1965, Ser. No. 476,507
5 Claims. (Cl. 29—95.1)

This invention relates to a branch and more particularly relates to a pot-type broach provided with a plurality of wafers or discs having splined teeth adapted to finish externally toothed workpieces such as gears, splines or the like so as to provide substantially exact form and to maintain substantially exact concentricity between the tooth form of each workpiece or its pitch diameter and the minor or inside diameter surface of the workpiece, or in some cases between the form and the major or outside diameter of the workpiece.

My copending application, Ser. No. 381,616 entitled "Broach," filed July 7, 1964, now Patent No. 3,317,383, describes in detail a broach having its teeth constructed, arranged and located on the broach body so that the broach produces in the broach part or workpeice the desired concentricity between the minor diameter, major diameter and the form or pitch diameter. The teaching of my copending application is applicable to external and internal broaches including pot-type broaches which are used to broach externally toothed workpieces. Regardless of the type of broach utilized in industry, it has been found that concentricity of the broach part or workpiece is generally achieved.

In pot broaching the relationship between the outside diameter of the gear blank and the major diameter of the form in the wafers of the broach is generally maintained in order to insure the best possible relationship of wafers to the gear blank. By actual test it was found however that some gear blanks were ground on their outside diameter to the high limit of part tolerance and other gear blanks were ground to the low limit of part tolerance. The difference betwen high and low limits of tolerance was .002." It was expected that the gear blanks which were constructed to the high limit should show less runout between the locating hole and the pitch diameter of the external teeth than those blanks which were at the low limit. The test results did not conform to the theoretical analysis of the problem since it was found that the smaller gear blanks when broached had less hole to pitch diameter runout than the larger blanks.

The gear blanks were inspected and it was determined that the outside diameter of the gear blanks had been shaved or cut by the major diameter or control diameter of the wafers of the broach. The shaving action by the major diameter of the wafers suggests that with machine misalignment or with unbalanced cutting condition in the broach wafers, enough pressures may be created that an eccentric condition is created by the shaving action of the major diameter of the broach wafers.

The present invention has solved the aforementioned problem by utilizing an internally toothed wafer design in which the leading edge of the major diameter of the teeth is beveled or relieved so as to form a non-cutting or non-shaving edge.

It is an object of the present invention to provide a pot-type broach comprising a plurality of internally toothed wafers, the leading edge of the major diameter of each toothed wafer being beveled or relieved so as to provide a non-cutting non-shaving surface.

Another object of the present invention is to provide a pot-type broach which is simple in construction, economical to manufacture and efficient in operation.

Further objects and advantages of the present invention will be apparent from the following description, reference being had to the accompanying drawing wherein a preferred form of the present invention is clearly shown.

FIGURE 1 is a plan view of a broaching tool assembly.

FIGURE 2 is a sectional view through a plurality of wafers incorporated in the broaching tool assembly of FIGURE 1.

FIGURE 3 is a fragmentary sectional view of the tooth construction of the wafers illustrated in FIGURE 2 and on a larger scale so as to illustrate features of the present invention.

FIGURE 4 is a plan view of a wafer taken on the line 4—4 of FIGURE 2.

FIGURE 5 is a front view of an unfinished gear blank.

FIGURE 6 is a front view of a finished gear after it has been finished by the pot-type broach of the present invention.

A pot-type broach contsructed in accordance with the present invention may utilize any of the teachings of my copending application, U.S. Ser. No. 381,616, now Patent 3,217,383, so as to result in an internal broach for producing an external splined part which has the desired concentricity in the broach part between the form and the minor diameter or in some cases between the form and the major diameter. Beside utilizing the major diameter of the gear form in the broach wafers for the guide element certain of the broach wafers are all backed-off on the forms to permit the broach wafers to side shave in the event of slight misalignment from one wafer to the next. In certain cases failure to back-off each form would result in part metal backup on the sides of the teeth of the wafers, resulting in tearing of the work and possibly ultimate breakage of the broach wafers.

In certain applications it is desirable to utilize in the finishing section of the pot-type broach splined wafers which alternate with round wafers so as to provide an outside diameter to pitch diameter relationship. This construction is advantageous in the event the user wishes to requalify the round locating hole of the blank from the outside diameter.

Referring now to FIGURE 1 there is illustrated a broach assembly 10 which is adapted to be mounted in a broaching machine. As an example the broach assembly 10 may be mounted on a support structure adapted to be secured to the under side of the vertical ram or slide of a suitable unit such as a hydraulic press as is described and claimed in the Russel W. Anthony copending application Ser. No. 380,871 entitled "Broaching Apparatus," filed May 28, 1964 assigned to the assignee of record.

Secured to the under side of the support structure, not shown, are a pair of elongated broach wafer support members 12 and 14 which are adapted to be clamped to the under side of the support structure by suitable means such as screws, not illustrated. The wafer support members 12 and 14 are adapted to be bolted together by a plurality of clamping screws 16. Each elongated member 12 and 14 is provided on its inner surface with two broach wafer-engaging surfaces which are designated by the numerals 18 and 20. Intermediate the surfaces 18 and 20 is a surface 22 preferably positioned to be in clearance with respect to the outer cylindrical surfaces 24 of the broach wafers or rings 26. The elongated member 12 includes additional surfaces 28 which are also positioned to have clearance with respect to the outer surfaces of the broach wafers 26.

Similiarly, the member 14 is provided with two angularly disposed flat surfaces 30 and 32 positioned to engage the cylindrical outer surfaces 24 of the broach wafers 26. The member 14 is further provided with a locating key 34 which extends into accurate locating grooves or recesses 36 provided in the outer surfaces 24 of the broach wafers or rings 26. Preferably the members 12 and 14 are dimensioned so that the abutting edge surfaces thereof, as indicated at 40, have a slight clearance as for example about .001", so that when the clamping screws 16 are tightened there is assurance that each of the broach rings or wafers 26 will be firmly clamped at four 90 degree points by the surfaces 18, 20, 30 and 32.

The multiplicity of broach rings or wafers 26 each include flat end surfaces 42. The end surfaces 42 of an adjacent pair of wafers 26 are in end abutment as shown in FIGURE 2. The uppermost wafer 26 may be in firm abutment against the under side of a plate, not shown, connected to the support of the broaching machine.

With this arrangement the broach rings or wafers 26 are of course individually ground while separated from the elongated support structure and are provided in a set, all of which are of identical outside diameter to a high degree of accuracy so as to insure adequate clamping. Moreover, each is provided with an identical locating groove 36 adapted to receive the key 34 so that the individual broach rings or wafer 26 may be initially ground and subsequently reground, separated from the holder, and thereafter assembled in proper sequence in the holder to produce a highly accurate broach assembly capable of producing correspondingly highly accurate finished gears.

The relationship between the flat clamping surfaces 18, 20, 30 and 32, and the locating key 34 is such as to provide extremely accurate location as well as firm and positive clamping of the broach wafers. When the elongated members 12 and 14 are assembled together by the clamping screws 16 the longitudinally extending opening provided centrally of the assembly for the reception of the broach wafers is generally octagonal in shape and the surfaces 18, 20, 30 and 32 are provided to engage the cylindrical peripheral surface of the broach wafers at substantially 90-degree intervals. Moreover, intermediate each of the four clamping surfaces referred to, there are provided additional surfaces in clearance with respect to the broach wafers, these being the surfaces 22 and 28 and the surface in which the locating key 34 is provided. The locating key 34 is disposed substantially intermediate the clamping surfaces 30 and 32. The locating surfaces 18, 20, 30 and 32 being flat surfaces, can be accurately ground. Moreover, since these surfaces extend at substantially 45-degree angles to the directions which the surfaces move relative to the cylindrical stack of broach wafers, the wafers 26 are brought into and maintained in true cylindrical registration as well as angular location with reference to the key 34 by the tightening of the clamping screws 16 as aforesaid.

Each annular broach ring or wafer 26 is provided with a group of laterally aligned cutting teeth 44. The teeth 44 of the wafers 26 are arranged in a plurality of longitudinally extending series of teeth. The cutting teeth 44 extend in axially disposed series if the broach is to form a spur member and the series are helically aligned if the broach is used to produce helical teeth on the workpiece. The term "longitudinal alignment" or the like is intended to cover arrangements for producing both spur and helical gears. The teeth 44 of a plurality of consecutive wafer 26, as best indicated in FIGURE 3, include cutting edges 44, 46 and 48, the adjacent cutting edges being connected by a land 50, tooth back 52, fillet 54 and a tooth face 56. The teeth 44 are progressively stepped from front to rear and are backed off at the top or minor diameter at an angle Phi. The sides of the teeth are also relieved or backed-off.

Each wafer 26 further includes a major or body diameter, hereinafter referred to as the "B.D.," a minor diameter, hereinafter referred to as the "M.D." and the form or pitch diameter, hereinafter referred to as the "P.D.". The major diameter "B.D." of each wafer 26 includes a leading edge which is provided with a pronounced relief or beveled surface indicated by the numeral 60 in FIGURE 3. With such a construction the leading edge of the "B.D." of each group of teeth is relieved or beveled so as to provide a non-cutting, non-shaving surface. As an example, a 45° bevel has been found satisfactory.

The broach assembly 10 includes a plurality of wafers 24 which form the leading section of the broach, and a plurality of wafers 26 which form the following section. In a particular embodiment each wafer is provided with 36 involute spline teeth. In a typical broach assembly containing 61 wafers, the first 57 (#1–57 inclusive) wafers form the teeth in the part and the last 4 wafers (#58–61) form the chamfer or corner break on the teeth. The first wafer has a "M.D." of 3.276" while the last tooth forming wafer has a "M.D." of 3.022". The first 12 wafers each decreases in its "M.D." from the preceding wafer in an increment of approximately .0043". The next 40 wafers each decreases on its "M.D." from the preceding wafer in an increment of .0050". Wafers #58–61 inclusive are shaped to provide the chamfers referred to above.

The end surfaces of all wafers are ground flat and parallel. All the wafers have the same outside diameter of 5.000". Each wafer has a thickness of .460±.001".

The gear blank G of FIGURE 5 includes a locating or surface hole 66 through which an approximate locator of the broaching machine extends to roughly locate the blank while the wafers are forced over the blank. The support for the blank permits lateral movement of the part so that to control eccentricity, it is necessary for the part to take its location from engagement with the broach. The body diameter or "B.D." of the broach assembly is a control element effective to eliminate eccentricity between the hole 66 in the blank G and the teeth 44 which are broached on the blank. In order to insure that the body diameter or "B.D." of the broach assembly performs its primary control function and does not perform any cutting or shaving action, the cutting edge which would otherwise be provided by the intersection between the body diameter of the broach and the flat end surface thereof is relieved or beveled such that no shaving of the gear blank G can possibly occur.

It will be understood that lateral forces may be developed during broaching a large number of parts, due possibly to unequal dulling of different portions of the broach or for other reasons. These lateral portions tend to shift the blank laterally with respect to the broach. When the lateral shifting brings the crests of the teeth on the blank into contact with broach surfaces on the body diameter, this engagement, since cutting is prevented, limits further lateral movement and therefore limits the amount of eccentricity which may possibly occur to an amount commensurate with the initial clearance between the outside diameter of the blank and the body diameter of the broach.

The drawing and the foregoing specification constitute a description of the improved pot broach in such full, clear, concise and exact terms as to enable any person skilled in the art to practice the invention, the scope of which is indicated by the appended claims.

What I claim as my invention is:

1. In a broach comprising a plurality of internally toothed wafers having a plurality of series of longitudinally aligned cutting teeth arranged in laterally aligned groups, each group of teeth having major, minor and pitch diameters, and the leading edge of a group of teeth on its major diameter being relieved so as to provide a non-cutting non-shaving surface.

2. In a broach comprising a plurality of internally toothed wafers having a plurality of series of longitudinally aligned cutting teeth arranged in laterally aligned groups, each group of teeth having major, minor and pitch diameters, and the leading edge of each group of teeth on its major diameter being beveled so as to provide a non-cutting non-shaving surface.

3. A broach wafer having a plurality of cutting teeth arranged in a laterally aligned group, said group having major, minor and pitch diameters, with the leading edge of the group of teeth being relieved on the major diameter so as to provide a non-cutting non-shaving surface.

4. A broach wafer having a plurality of cutting teeth arranged in a laterally aligned group, said group having major, minor and pitch diameters, with the leading edge of the group of teeth being beveled on the major diameter to provide a non-shaving surface throughout the extent of the major diameter.

5. A broach wafer having a plurality of finish cutting teeth arranged in a laterally aligned group, each tooth having major, minor and pitch diameters, the majority of the leading edges of the teeth being relieved on the major diameters so as to provide non-cutting surfaces.

No references cited.

HARRISON L. HINSON, *Primary Examiner.*